(12) United States Patent
Papini et al.

(10) Patent No.: US 10,256,708 B2
(45) Date of Patent: Apr. 9, 2019

(54) ELECTRIC MACHINE

(71) Applicant: General Electric Company, Schenectady, NY (US)

(72) Inventors: Francesco Papini, Munich (DE); Mohamed Osama, Garching (DE); Anoop Kumar Jassal, Munich (DE)

(73) Assignee: General Electric Company, Schenectady, NY (US)

( * ) Notice: Subject to any disclaimer, the term of this patent is extended or adjusted under 35 U.S.C. 154(b) by 253 days.

(21) Appl. No.: 15/272,899

(22) Filed: Sep. 22, 2016

(65) Prior Publication Data
US 2018/0083520 A1 Mar. 22, 2018

(51) Int. Cl.
*H02K 21/14* (2006.01)
*H02K 19/02* (2006.01)
*H02K 1/27* (2006.01)
*H02K 29/03* (2006.01)
*H02K 1/24* (2006.01)

(52) U.S. Cl.
CPC ............. *H02K 21/14* (2013.01); *H02K 1/246* (2013.01); *H02K 1/2706* (2013.01); *H02K 1/276* (2013.01); *H02K 1/2786* (2013.01); *H02K 19/02* (2013.01); *H02K 29/03* (2013.01)

(58) Field of Classification Search
CPC ........ H02K 21/14; H02K 1/246; H02K 1/276; H02K 1/2706; H02K 1/2786; H02K 29/03
See application file for complete search history.

(56) References Cited

U.S. PATENT DOCUMENTS

| 5,182,483 | A | 1/1993 | Hibino et al. |
| 7,932,658 | B2 | 4/2011 | Ionel |
| 9,209,657 | B2 | 12/2015 | Huppunen et al. |
| 2003/0030343 | A1 | 2/2003 | Naito et al. |
| 2007/0152527 | A1* | 7/2007 | Yura ................ H02K 1/246 |
| | | | 310/156.53 |

(Continued)

FOREIGN PATENT DOCUMENTS

| CN | 105914925 A | 8/2016 |
| DE | 10 2012 101 822 A1 | 10/2013 |

(Continued)

OTHER PUBLICATIONS

Nau, "The Influence of the Skewed Rotor Slots on the Magnetic Noise of Three-Phase Induction Motors", Electrical Machines and Drives, 1997 Eighth International Conference on (Conf. Publ. No. 444), pp. 396-399, Sep. 1-3, 1997.

(Continued)

*Primary Examiner* — Robert W Horn
(74) *Attorney, Agent, or Firm* — GE Global Patent Operation; Nitin N. Joshi

(57) ABSTRACT

An electric machine includes a stator and a rotor operable with the stator. The rotor includes at least one pole section, the pole section defining a direct axis in a flux barrier having a first end and a second end. Each of the first and second ends are positioned proximate to the stator. The first end defines a first angular position relative to the direct axis and the second end defines a second angular position relative to the direct axis. The first angular position is different in magnitude than the second angular position to reduce a torque ripple or torque oscillation of the electric machine.

19 Claims, 9 Drawing Sheets

(56) References Cited

U.S. PATENT DOCUMENTS

| | | |
|---|---|---|
| 2010/0019612 A1 | 1/2010 | Lefley |
| 2013/0147309 A1 | 6/2013 | Rahman et al. |
| 2014/0246943 A1 | 9/2014 | Omekanda et al. |
| 2015/0069863 A1 | 3/2015 | Papini et al. |
| 2018/0083520 A1* | 3/2018 | Papini .................... H02K 21/14 |

FOREIGN PATENT DOCUMENTS

| | | |
|---|---|---|
| EP | 1689066 A2 | 8/2006 |
| JP | 2006-223052 A | 8/2006 |
| WO | 2014124729 A2 | 8/2014 |
| WO | 2014/188757 A1 | 11/2014 |
| WO | 2015189137 A1 | 12/2015 |

OTHER PUBLICATIONS

Sanada et al., "Torque ripple improvement for synchronous reluctance motor using asymmetric flux barrier arrangement", Industry Applications Conference, 2003. 38th IAS Annual Meeting. Conference Record of the, vol. 1, pp. 250-255, Jul.-Aug. 2004.

Fei et al., "Comparison of Cogging Torque Reduction in Permanent Magnet Brushless Machines by Conventional and Herringbone Skewing Techniques", IEEE Transactions on Energy Conversion, vol. 28, No. 3, pp. 664-674, Sep. 2013.

Extended European Search Report and Opinion issued in connection with corresponding EP Application No. 17191421.1 dated Jan. 25, 2018.

\* cited by examiner

ELECTRIC MACHINE

FIELD OF THE INVENTION

The present disclosure relates generally to electric machines and, more particularly, to synchronous electric machines.

BACKGROUND OF THE INVENTION

Synchronous reluctance machines and interior permanent magnet machines may be particularly well suited for use in propulsion (e.g., any force or thrust gained through a fluid medium) devices for aircrafts, as well as for use as a powerplant in traction devices (e.g., road or railway vehicles) and marine devices (e.g., ships).

Depending on a magnitude, torque "ripple", or torque oscillations, of the above electric machines, may result in damage to a rotor and/or the mechanical system(s) connected to the electric machines (due to fatigue or excessive torque). Additionally, the frequency of the torque ripple might excite resonant modes of the mechanical system(s), posing an additional threat to the above electric machines and/or surrounding systems.

Various attempts at reducing torque ripple have been researched. These attempts generally include either a stator based design, or a rotor based design. The stator based designs typically include stator slot width optimization, stator tooth pairing, stator tooth notching, odd slot numbers, stator tooth shifting, or stator skewing. The rotor based designs include rotor pole width optimization, magnet shaping, magnet pole shifting, rotor pole pairing, magnetization pattern, magnet segmentation, or rotor skewing. All those approaches inevitably lead to some degree of compromise in an overall performance of the machine and have their own limitations.

Accordingly, there is an ongoing need for improving on current electric machine technologies and/or manufacturing thereof that address at least one of complexity, cost, efficiency, and/or performance without some of the current tradeoffs encountered with current methodologies.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure an electric machine is provided. The electric machine includes a stator and a rotor operable with the stator and including a pole section. The pole section defines a direct axis and a flux barrier including a first end and a second end. The first end of the flux barrier is positioned proximate the stator and defines a first angular position relative to the direct axis. The second end is positioned proximate the stator and defines a second angular position relative to the direct axis. The first angular position is different in magnitude than the second angular position.

In another exemplary embodiment of the present disclosure a synchronous electric machine is provided. The synchronous electric machine includes a stator and a rotor operable with the stator. The rotor includes a first pole section defining a first direct axis and a first flux barrier. The first flux barrier includes a first end defining a first angular position and a second end defining a second angular position. The first angular position of the first end of the first flux barrier is equal in magnitude to the second angular position of the second end of the first flux barrier. The rotor also includes a second pole section defining a second direct axis and a second flux barrier. The second flux barrier includes a first end defining a first angular position and a second end defining a second angular position. The first angular position of the first end of the second flux barrier is different in magnitude than the second angular position of the second end of the second flux barrier.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
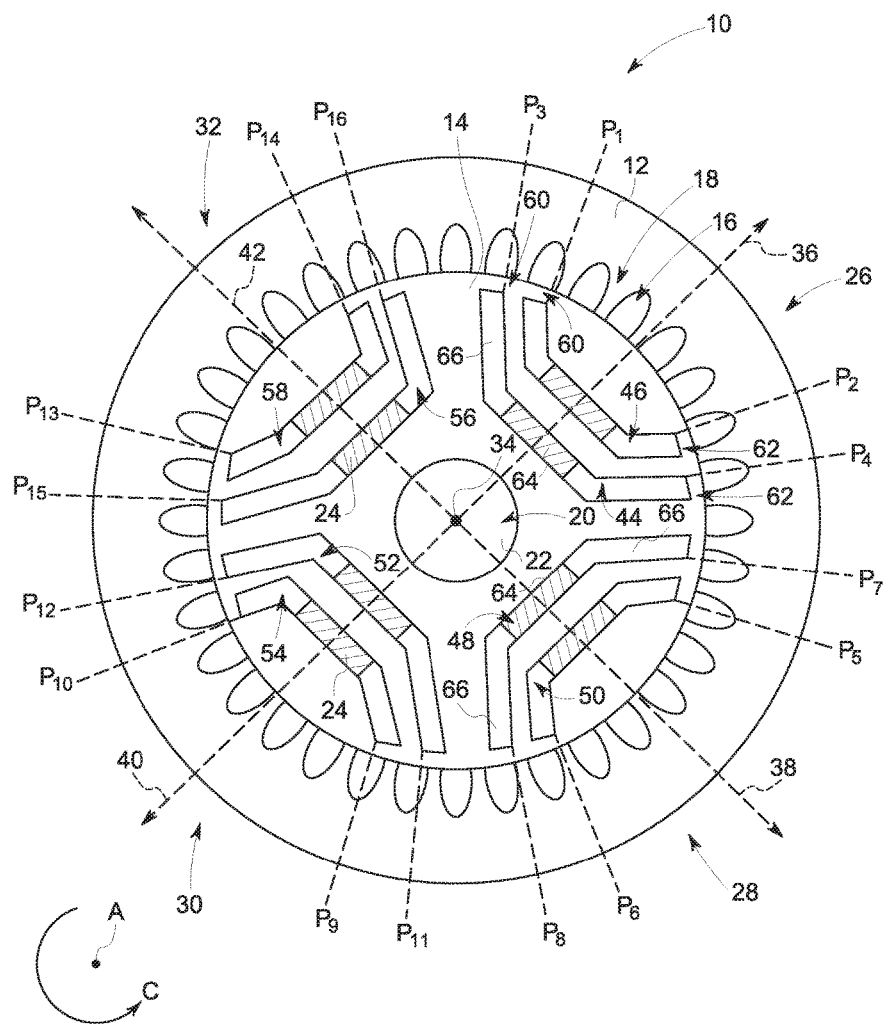
FIG. 1 is a cross-sectional view of an interior structure of an electric machine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. Additionally, terms of approximation, such as "about" or "substantially," refer to being within an accepted tolerance without affected a desired function of the component.

The present disclosure provides for a synchronous electric machine having a rotor geometry configured to reduce an amount of torque oscillations during operation. For example, the present disclosure may apply to an interior permanent magnet synchronous machine and/or a synchronous reluctance machine, each configured as either an electric motor or electric generator. The synchronous electric machine generally includes a stator and a rotor rotatable relative to the stator having a plurality of pole sections. Each of the pole sections defines a flux barrier and a direct axis. As used here the term "direct axis" refers to a reference direct axis, i.e., an axis of minimum magnetic permeance of a reference pole section (e.g., a first pole section 26, described below), as well as a plurality of additional axes for each successive pole section, including any modified pole sections, located at equal intervals along a circumferential direction C (see below) of the electric machine. Accordingly, as used herein, each of the plurality of direct axes of a rotor are evenly spaced along the circumferential direction, with a first direct axis aligning with an axis of minimum magnetic permeance of a reference pole section.

The flux barrier of at least one of the pole sections includes a first end and a second end, each positioned proximate to the stator and defining an angular position relative to the direct axis of the respective pole section. The present disclosure provides for the second angular position to be different in magnitude than the first angular position to reduce torque oscillations of the electric machine during operation. Specifically, such a configuration provides for an asymmetric design between each stator "tooth" or coil and end of the flux barrier(s), such that a torque ripple or oscillation is reduced during operation.

Referring now to the drawings, wherein identical numerals indicate the same elements throughout the figures, FIG. 1 is a cross-sectional view illustrating the interior structure of an electric machine, or more particularly, for the embodiment depicted, an interior permanent magnet synchronous motor 10. Referring to FIG. 1, the interior permanent magnet synchronous motor 10 includes an approximately cylindrical stator 12 and a rotor 14 operable with and rotatably received within a substantially cylindrical shaped opening of the stator 12. Accordingly, the motor 10 may be referred to as an in-runner motor. Additionally, the motor 10 defines an axial direction A and a circumferential direction C. During operation the rotor 14 generally rotates along the circumferential direction C about the axial direction A relative to the stator 12.

The stator 12 may be a cylindrical stack of a plurality of laminated magnetic steel plates. A plurality of slots 16 are formed at an inner circumferential wall of the stator 12 so that they are equidistantly arranged in the circumferential direction C of the motor 10. A plurality of coils 18 are wound between the adjacent slots 16. Although not depicted, a power supply and inverter may communicate with and control a speed and torque of the motor 10.

The rotor 14 may also be formed of a cylindrical stack of a plurality of laminated magnetic steel plates. Alternatively, however, the rotor 14 (and/or stator 12) may be formed of a single piece of material, e.g., solid steel, for example, through a suitable forging, casting, or additive manufacturing process. The rotor 14 is formed with an axial shaft hole 20, so that a rotating shaft 22 may be press-fitted in the shaft hole 20 to simultaneously rotate with the rotor 14. The shaft 22 may extend generally along the axial direction A. It will be appreciated, however, that in other embodiments, the rotating shaft 22 may be attached to the rotor 14 in any other suitable manner.

Figure 4:
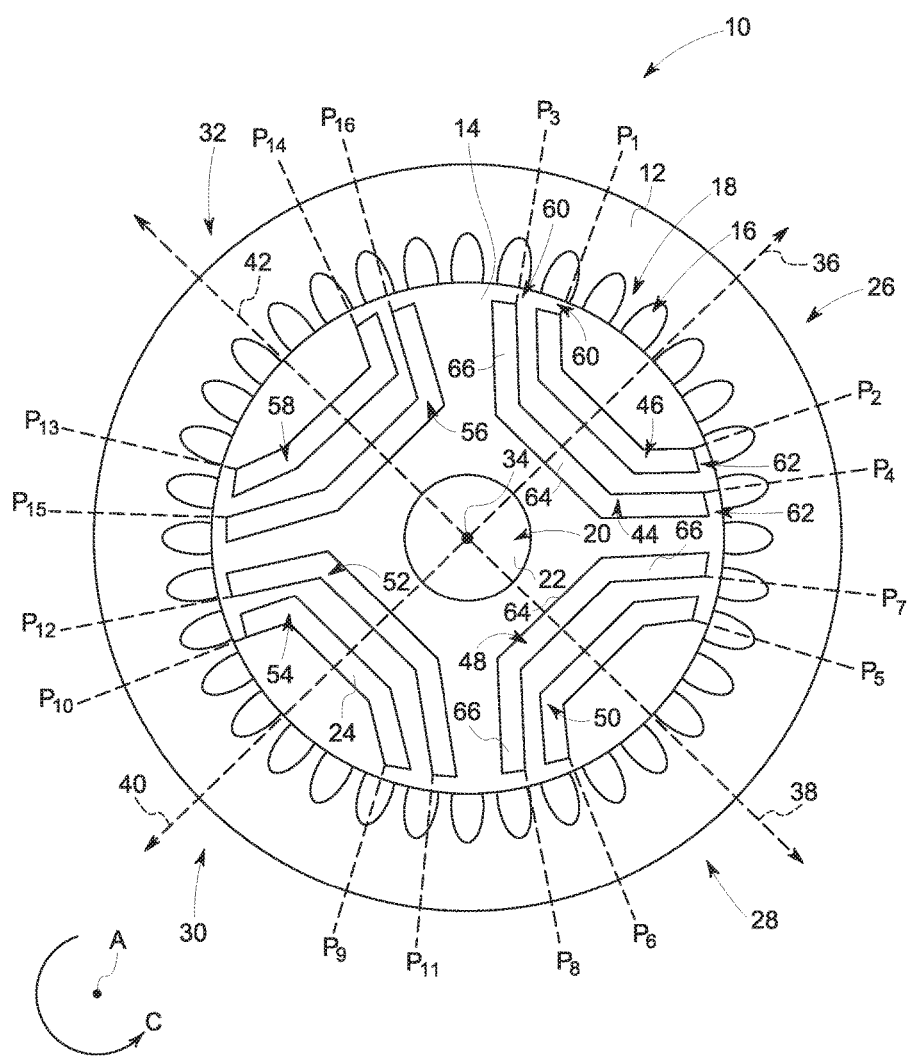
FIG. 4 is a cross-sectional view of an interior structure of an electric machine in accordance with another exemplary embodiment of the present disclosure.

As will be discussed in greater detail below, the rotor 14 includes a plurality of circumferentially spaced pole sections, with each pole section defining a direct axis and one or more flux barriers. More specifically, for the embodiment depicted, the rotor 14 includes four pole sections, with each pole section including a pair of flux barriers. Additionally for the embodiment depicted, each of the plurality of flux barriers includes a permanent magnet 24 positioned therein, such that the motor 10 may be referred to as an interior permanent magnet synchronous machine. It should be appreciated that in other embodiments the permanent magnets 24 may instead be positioned at any other suitable location within the flux barriers, or alternatively, no permanent magnets 24 may be positioned in the flux barriers (see, e.g., the synchronous reluctance machine of FIG. 4).

With the above-described configuration, if electric current is applied to the coils 18 of the stator 12, a polarity of each of the coils 18 is changed in sequence. Both a repulsive force and a traction force can generate a centrifugal force, so that the rotor 14 generates a rotation drive force while simultaneously rotating with the rotating shaft 22.

However, referring still to FIG. 1, the present disclosure includes a rotor geometry for reducing torque ripple and vibrations of the rotating shaft during operation of the motor 10. As briefly stated above, the rotor 14 includes a plurality of pole sections. More specifically, for the embodiment depicted, the rotor 14 includes a first pole section 26, a second pole section 28, a third pole section 30, and a fourth pole section 32. Additionally, each pole section defines a direct axis extending from a central axis 34 of the rotor 14. Accordingly, the first pole section 26 defines a first direct axis 36, the second pole section 28 defines a second direct axis 38, the third pole section 30 defines a third direct axis 40, and the fourth pole section 32 defines a fourth direct axis 42. The pole sections 26, 28, 30, 32 and direct axes 36, 38, 40, 42 are spaced evenly along the circumferential direction C of the motor 10, such that each of the direct axes 36, 38, 40, 42 defines the same angle with an adjacent direct axis—the angle between adjacent direct axes being equal to 360°/n, where "n" is the number of pole sections. Accordingly, for the embodiment depicted, the angle between each of the adjacent direct axes 36, 38, 40, 42 is ninety degrees (90°).

Further, each pole section 26, 28, 30, 32 defines one or more flux barriers. For the embodiment depicted, each pole section defines two flux barriers, an inner flux barrier and an outer flux barrier. Specifically, the first pole section 26 defines a first inner flux barrier 44 and a first outer flux barrier 46; the second pole section 28 defines a second inner flux barrier 48 and a second outer flux barrier 50; the third pole section 30 defines a third inner flux barrier 52 and a third outer flux barrier 54; and the fourth pole section 32 defines a fourth inner flux barrier 56 and a fourth outer flux barrier 58. Each of the flux barriers includes a first end 60 and a second end 62. The first and second ends 60, 62 of the flux barriers are positioned proximate the stator 12. It should be appreciated, however, that in other embodiments, each pole section 26, 28, 30, 32 may instead define any other suitable number of flux barriers. For example, in other embodiments, each pole section 26, 28, 30, 32 may include a single flux barrier, or alternatively, may include three or more flux barriers. Each of the plurality of flux barriers of a pole section are, for the embodiment depicted, nested within one another, such that an inner flux barrier wraps at least partially around a respective outer flux barrier.

As is depicted, each of the plurality of flux barriers are configured as openings or slots in the rotor 14 and may include any non-ferromagnetic material (e.g., air or a magnetic insulator) in addition to, as previously stated, a permanent magnet 24 positioned therein. More specifically, each of the plurality of flux barriers includes a base portion 64 and a pair of oppositely positioned arm portions 66. For the embodiment depicted, the permanent magnets 24 are positioned within the base portions 64 of each of the respective flux barriers. Notably, the arm portions 66 define the first and second ends 60, 62 of the respective flux barriers at distal ends thereof. It should be appreciated, however, that in other embodiments, the permanent magnets 24 may additionally, or alternatively be positioned in the arm portions 66.

Moreover, each of the first and second ends 60, 62 of the plurality of flux barriers defines an angular position relative to a respective direct axis. As used herein, the term "angular position" with respect to a direct axis refers to an angle between a direct axis of the pole section within which the flux barrier is positioned and a reference line extending from the central axis 34 of the rotor 14 through an inner corner of the end (such as the first end 60 or second end 62) of the flux barrier.

For the embodiment depicted, for at least one of the pole sections the first and second ends 60, 62 of the flux barriers have been modified/tilted to reduce an amount of torque oscillations. More specifically, for the embodiment depicted, at least one of the flux barriers of at least one of the pole sections includes a first angular position of a first end 60 of a flux barrier that is different than a second angular position of a second end 62 of the flux barrier, while at least one of the flux barriers of a different pole section includes a first angular position of a first end 60 of a flux barrier that is equal in magnitude to a second angular position of a second end 62 of the flux barrier.

More specifically, referring still to the embodiment of FIG. 1, the first pole section 26 includes the first inner flux barrier 44 and the first outer flux barrier 46, each including a first end 60 and a second end 62. The first end 60 of the first outer flux barrier 46 defines an angular position P1 and the second end 62 of the first outer flux barrier 46 defines an angular position P2. Additionally, the first end 60 of the first inner flux barrier 44 defines an angular position P3 and the second end 62 of the first inner flux barrier 44 defines an angular position P4. For the embodiment depicted the angular position P1 is equal in magnitude to the angular position P2, such that the first outer flux barrier 46 is symmetric about the direct axis 36. Additionally for the embodiment depicted, the angular position P3 is equal in magnitude to the angular position P4, such that the first inner flux barrier 44 is also symmetric about the direct axis 36. As used herein, "equal" refers to being within an acceptable degree of variance; for example, with a four pole electric machine, "equal" refers to being within a plus or minus 0.05 degree variance. However, with electric machines having less than four poles, or more than four poles, the degree of variance may vary accordingly.

Figure 2:
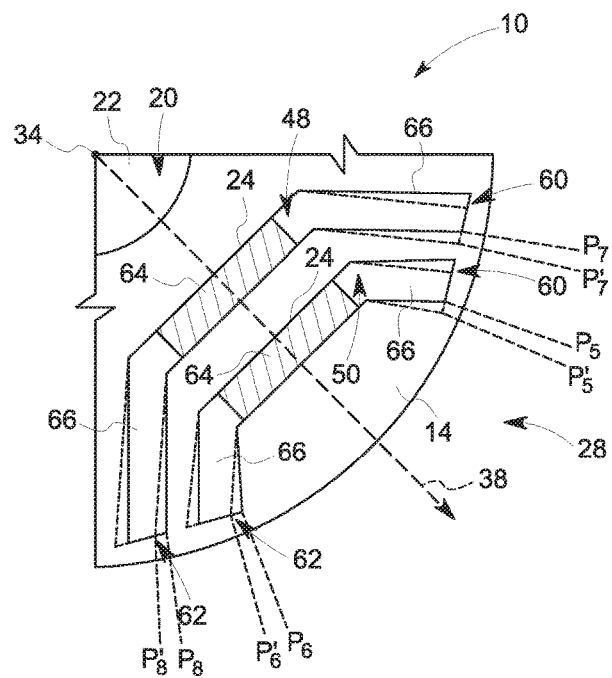
FIG. 2 is a close-up view of a pole section of a rotor the exemplary electric machine of FIG. 1, in accordance with an exemplary embodiment of the present disclosure.

By contrast, reference will now additionally be made to FIG. 2, providing a close-up view of the second pole section 28 of the exemplary rotor 14 depicted in FIG. 1. As is depicted, the second pole section 28 includes the second inner flux barrier 48 and the second outer flux barrier 50. The second inner flux barrier 48 includes a first end 60 and a second end 62 and the second outer flux barrier 50 also includes a first end 60 and a second end 62. The first end 60 of the second outer flux barrier 50 defines an angular position P5 and the second end 62 of the second outer flux barrier 50 defines an angular position P6. Similarly, the first end 60 of the second inner flux barrier 48 defines an angular position P7 and the second end 62 of the second inner flux barrier 48 defines an angular position P8. By contrast to the first pole section 26, the angular position P5 is different in magnitude than the angular position P6 (such that the second outer flux barrier 50 is asymmetric about the direct axis 38), and further, the angular position P7 is also different in magnitude than the angular position P8 (such that the second inner flux barrier 48 is asymmetric about the direct axis 38).

Referring still to FIG. 2, it will be appreciated, that as mentioned above, the first and second ends 60, 62 of the second inner and outer flux barriers 48, 50 have been tilted relative to a baseline position. The "baseline position" refers to a position wherein the first angular position P5 would be equal in magnitude to the angular position P6, and wherein the angular position P7 would be equal in magnitude to the angular position P8—similar to the configuration of the first pole section 26. The baseline positions P5', P6', P7' and P8' of the first and second ends 60, 62 of the second inner and outer flux barriers 48, 50 are depicted in phantom. As is depicted, the angular position P5 of the first end 60 of the second outer flux barrier 50 has been increased relative to a baseline angular position P'5 of the first end 60 of the second outer flux barrier 50, while an angular position P6 of the second end 62 of the second outer flux barrier 50 has been reduced relative to a baseline angular position P'6 of the second end 62 of the second outer flux barrier 50. Similarly, the angular position P7 of the first end 60 of the second inner flux barrier 48 has been increased relative to a baseline angular position P'7 of the first end 60 of the second inner flux barrier 48, while an angular position P8 of the second end 62 of the second inner flux barrier 48 has been reduced relative to a baseline angular position P'8 of the second end 62 of the second inner flux barrier 48. Specifically for the embodiment depicted, |P5'|=|P6'|=|P1|=|P2| and |P7'|=|P8'|=|P3|=|P4|. By contrast, |P5|>|P5'|; |P6|<|P6'|; |P7|>|P7'|; and |P8|<|P8'|.

For the exemplary embodiment depicted, the angular positions have been varied from the baseline angular positions by tilting the arms 66 of the flux barriers 48, 50 relative to the respective bases 64 of the flux barriers 48, 50. However, in other embodiments, the angular positions may instead be varied in any other suitable manner.

In at least certain exemplary embodiments, the angular position P5 of the first end 60 of the second outer flux barrier 50 may define a difference D1 in magnitude relative to the angular position P6 of the second end 62 of the second outer flux barrier 50 of at least about 0.10°. For example, the difference D1 may be at least about 0.20°, such as at least about 0.25°, such as at least about 0.40°, such as at least about 0.50°. However, in other embodiments, the difference D1 may have any other suitable or desirable degree of difference. Additionally, for the embodiment depicted a difference D2 of the first and second ends 60, 62 of the second inner flux barrier 48 is substantially equal to the difference D1. Also for the embodiment depicted, the difference in magnitude between the angular positions P5 and P6 is accomplished by tilting each of the first and second ends 60, 62 of the second outer flux barrier 50 clockwise (for the embodiment depicted) a substantially equal amount relative to the baseline positions P'5, P'6. Accordingly, for the embodiment depicted, the following equation is accurate:

$$|P5| + \frac{D1}{2} = |P6| - \frac{D1}{2}.$$

Therefore, as will be discussed in greater detail below, the first inner flux barrier 48 defines a total angular difference (i.e., |P1|+|P2|) and the second inner flux barrier 52 also defines a total angular difference (i.e., |P5|+|P6|). The total angular difference of the first inner flux barrier 48 is equal to the total angular difference of the second inner flux barrier 52. Notably, the same may be said for the difference D2 of the first and second ends 60, 62 of the second inner flux barrier 48, as well as for the differences between each of the first and second ends 60, 62 described below (i.e., differences D3 through D6).

However, in other embodiments, a difference in magnitude between the various angular positions may instead be accomplished by tilting a single one of the first or second ends 60, 62 of the respective flux barrier, or by tilting the first end 60 of a flux barrier a different amount than the second end 62 of the respective flux barrier, or in accordance with any other suitable method described herein.

Referring now back to FIG. 1, it will be appreciated, that for the embodiment depicted, the first and second ends 60, 62 of the third and fourth inner and outer flux barriers 52, 54, 56, 58 of the third and fourth pole sections 30, 32 are also tilted (relative to a baseline position, shown in phantom), but in a nonuniform manner with respect to the second pole section 28.

More specifically, the first end 60 of the third outer flux barrier 54 defines an angular position P9 and the second end 62 of the third outer flux barrier 54 defines an angular position P10. Further, the first end 60 of the third inner flux barrier 52 defines an angular position P11 and the second end 62 of the third inner flux barrier 52 defines an angular position P12. The angular position P9 of the first end 60 of the third outer flux barrier 54 defines a difference D3 in magnitude from the angular position P10 of the second end 62 of the third outer flux barrier 54, and the angular position P11 of the first end 60 of the third inner flux barrier 52 defines a difference D4 in magnitude from the angular position P12 of the second end 62 of the third inner flux barrier 52. Notably, as is also depicted in FIG. 2, FIG. 1 depicts the baseline positions of the respective flux barriers of the third pole section 30 and the fourth pole section 32 in phantom.

Further, the first end 60 of the fourth outer flux barrier 58 defines an angular position P13 and the second end 62 of the fourth outer flux barrier 58 defines an angular position P14. Additionally, the first end 60 of the fourth inner flux barrier 56 defines angular position P15 and the second end 62 of the fourth inner flux barrier 56 defines an angular position P16. The angular position P13 of the first end 60 of the fourth outer flux barrier 58 defines a difference D5 in magnitude from the angular position P14 of the second end 62 of the fourth outer flux barrier 58, and the angular position P15 of the first end 60 of the fourth inner flux barrier 56 defines a difference D6 in magnitude from the angular position P16 of the second end 62 of the fourth inner flux barrier 56.

For the embodiment depicted, the difference D3 is substantially equal to the difference D4 [D3=|P9|−|P10|=D4=|P11|−|P12|], and the difference D5 is substantially equal to the difference D6 [D5=|P13|−|P14|=D6=|P15|−|P16|]. Moreover, for the embodiment depicted, the differences D3, D4 are equal to about twice the differences D1, D2, and furthermore, the differences D5, D6 are equal to about twice the differences D3, D4. For example: 4×D1=4×D2=2×D3=2×D4=D5=D6. Furthermore, for the embodiment depicted, the differences in magnitude between the various angular positions of the first and second ends 60, 62 of the flux barriers 52, 54, 56, 58 of the third and fourth pole sections 30, 32 may be accomplished in substantially the same manner as the differences in magnitude between the angular positions of the first and second ends 60, 62 of the second inner and outer flux barriers 48, 50 of the second pole section 28. Alternatively, the differences in magnitude may be accomplished in any other suitable manner. Additionally, in other embodiments, the differences in magnitude between the various angular positions may be accomplished by providing a constant increase progressing though the various pole sections (e.g., D5=D6=D4+d=D3+d=D1+2d=D2+2d; where "d" is a constant), or by providing a single difference applied to select pole sections (see, e.g., FIGS. 12 and 13).

Additionally, it should be appreciated that in other embodiments the rotor 14 may have any other suitable geometry for reducing an amount of torque oscillations during operation of the motor 10. For example, in certain embodiments the angular positions of the first and second ends 60, 62 of the flux barriers of the various pole sections may define any other suitable differences in magnitude. Additionally, in certain embodiments, instead of the differences in magnitude of the angular positions of the first and second ends 60, 62 of the flux barriers of the sequential pole sections gradually increasing (or, as in the embodiment depicted, sequentially doubling), in other embodiments, the differences in magnitude of the angular positions of the first and second ends 60, 62 of the flux barriers may alternate between sequential pole sections. For example, in certain embodiments, the differences D3, D4 of the first and second ends 60, 62 of the third inner and outer flux barriers 52, 54 may be equal to zero, and the differences D5, D6 of the first and second ends 60, 62 of the fourth inner and outer flux barriers 56, 58 may be substantially equal to the differences D1, D2 of the first and second ends 60, 62 of the second inner and outer flux barriers 48, 50.

Figure 3:
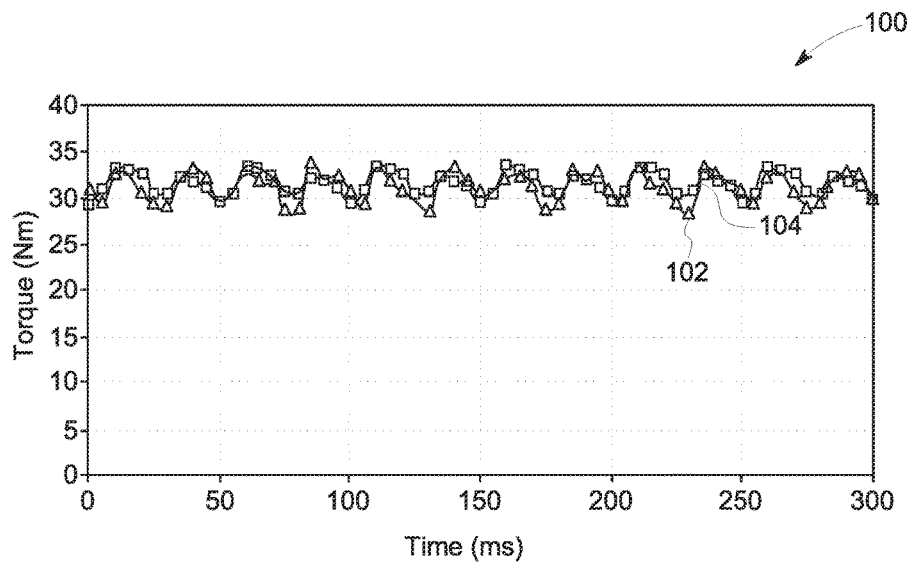
FIG. 3 is a graph depicting torque oscillations of an electric machine in accordance with an exemplary aspect of the present disclosure.

Referring now to FIG. 3, a graph 100 is depicted showing a reduction in torque oscillations resulting from increasing and decreasing the angular positions of the first and second ends 60, 62 of the various inner and outer flux barriers of the various pole sections in accordance with an exemplary embodiment of the present disclosure. The graph 100 includes a reference line 102 of the torque oscillations for a motor 10 having a rotor 14 with each of the first and second ends 60, 62 of the various flux barriers equidistantly spaced along the circumferential direction C of the motor 10 (i.e., with each of the first and second ends 60, 62 of the various flux barriers in a "baseline position"). By contrast the line 104 depicts the torque oscillations for motor 10 having a rotor 14 in accordance with an exemplary embodiment of the present disclosure, such as the exemplary embodiment of FIG. 1. As is depicted, a magnitude of the torque oscillations is reduced by inclusion of a rotor 14 in accordance with an exemplary embodiment of the present disclosure.

It should be appreciated, however, that the present disclosure is not limited to an in-runner, interior permanent magnet synchronous machine. For example, referring now to FIG. 4, an electric machine in accordance with another exemplary embodiment of the present disclosure is depicted. The exemplary electric machine may be configured in substantially the same manner as exemplary interior permanent magnet synchronous motor 10 described above with reference to FIGS. 1 and 2. However, for the embodiment depicted, the electric machine does not include the permanent magnets 24, and instead includes a non-ferromagnetic material positioned within an entirety of each of the plurality of flux barriers. For example, in certain embodiments, the electric machine may simply include air within each of the plurality of flux barriers. Accordingly, for the embodiment of FIG. 4, the electric machine may be configured as a synchronous reluctance machine, or a synchronous reluctance electric motor 10.

Figure 5:
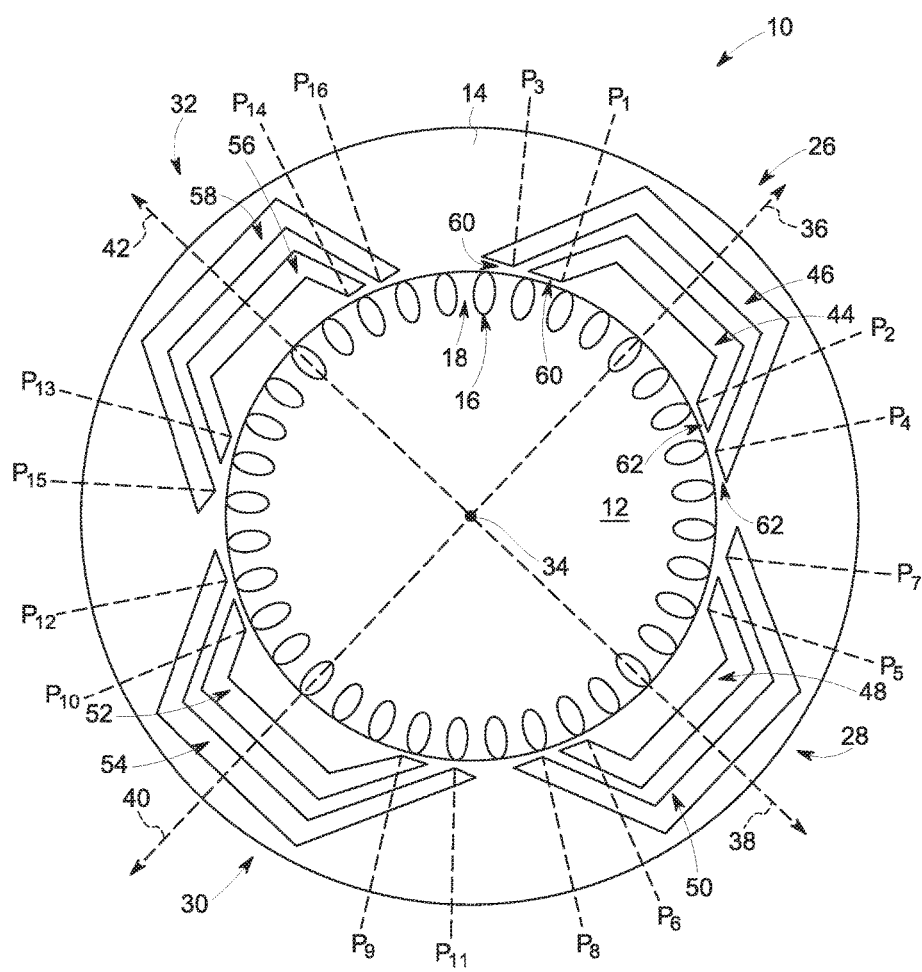
FIG. 5 is a cross-sectional view of an interior structure of an electric machine in accordance with yet another exemplary embodiment of the present disclosure.

Moreover, referring now to FIG. 5, an electric machine in accordance with still another exemplary embodiment of the present disclosure is depicted. The exemplary electric machine of FIG. 5 may also be configured in substantially the same manner as exemplary in-runner, interior permanent magnet synchronous motor 10 described above with reference to FIGS. 1 and 2, including a rotor 14 and a stator 12. The rotor 14 is rotatable relative to the stator 12, however for the embodiment depicted, the rotor 14 is not positioned within a substantially cylindrical opening of the stator 12. Instead, for the embodiment depicted, the stator 12 is positioned within the rotor 14. For such an embodiment, the electric machine may be referred to as an out-runner electric machine.

Notably, it will be appreciated, that for the embodiments described above with reference to FIGS. 1 and 2, FIG. 4, and FIG. 5, a difference in magnitude between a first angular position of a first end of a flux barrier and a second angular position of a second end of the flux barrier, relative to a direct axis of the pole section, is achieved by tilting a first arm of the flux barrier in a first direction (e.g., clockwise) and tilting a second arm of the flux barrier also in the first direction.

Figure 6:
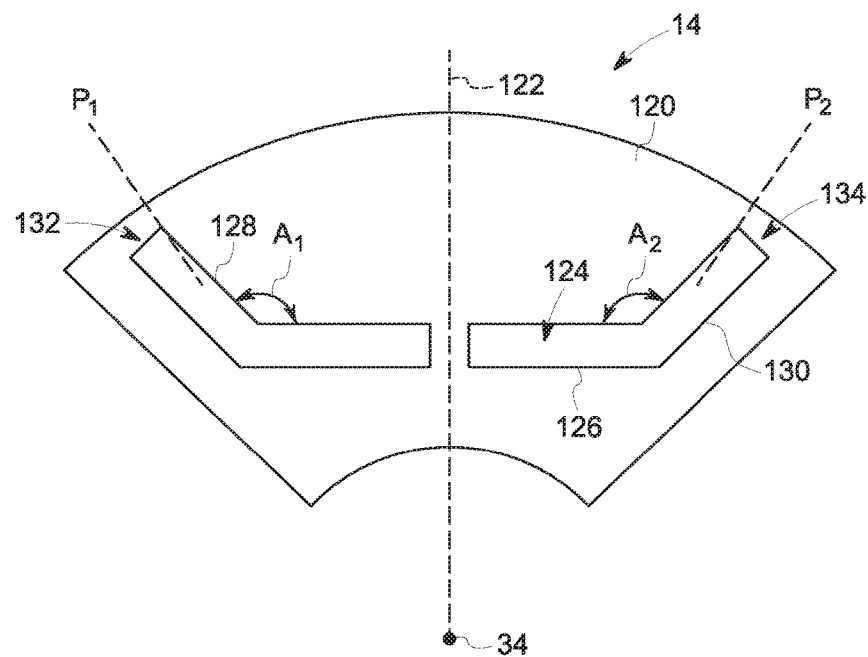
FIG. 6 is a close-up view of a reference pole section of a rotor in accordance with an exemplary embodiment of the present disclosure.
Figure 7:
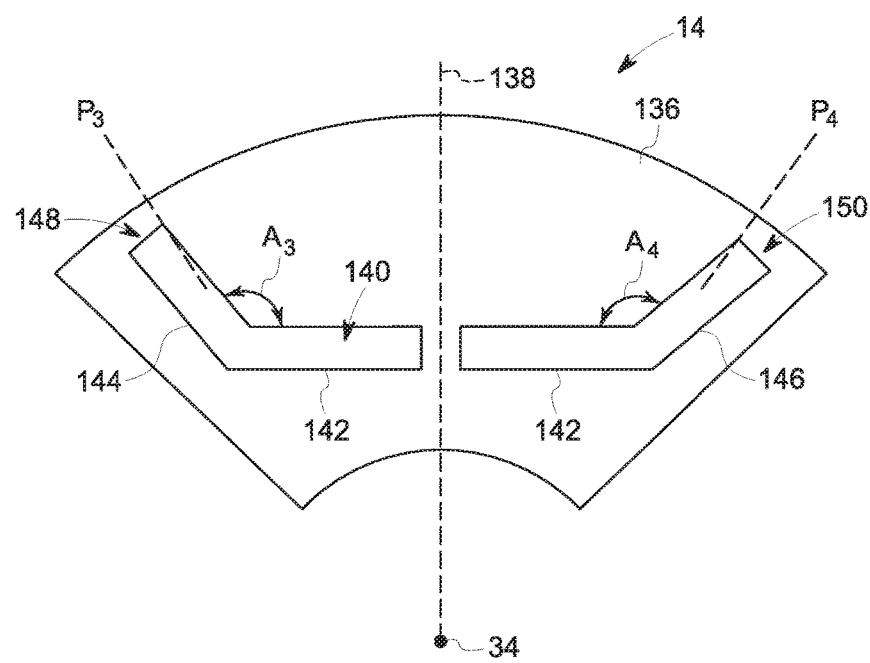
FIG. 7 is a close-up view of a modified pole section of a rotor in accordance with an exemplary embodiment of the present disclosure.

Referring now to FIGS. 6 and 7, this "tilting" embodiment shown in greater detail. Referring first to FIG. 6, a "reference" pole section 120 of a rotor 14 of an electric machine is depicted. The pole section 120 defines a direct axis 122 extending from a central axis 34 of the electric machine. The pole section 120 includes a flux barrier 124 including a base 126, a first arm 128, and a second arm 130. Additionally, the flux barrier 124 includes a first end 132 having a first angular position P1 at the first arm 128 and a second end 134 having a second angular position P2 at the second arm 130. As stated, the pole section 120 of FIG. 6 is a reference pole section, such that the flux barrier 124 is symmetric about the direct axis 122. Accordingly, the first angular position P1 of the first end 132 of the flux barrier 120 is equal in magnitude to the second angular position P2 of the second end 134 of the flux barrier 120. Notably, the flux barrier 120 additionally defines a total angular difference between the first angular position P1 and the second position P2 (i.e., |P1|+|P2|). Moreover, the first arm 128 of the flux barrier defines a first angle A1 with the base 126 of the flux barrier and the second arm 130 defines a second angle A2 with the base 126 of the flux barrier 120. The first angle A1 and the second angle A2 are equal in value.

By contrast, FIG. 7 depicts a pole section 136 of a rotor 14 of the electric machine configured in a substantially similar manner to the exemplary pole section 120 of FIG. 6, but with the arms of the flux barrier "tilted". As is depicted, the pole section 136 defines a direct axis 138 and includes a flux barrier 140, the flux barrier including a base 142, a first arm 144, and a second arm 146. The first arm 144 includes a first end 148 at a first angular position P3 and the second arm 146 includes a second end 150 at a second angular position P4. The first angular position P3 is different magnitude than the second angular position P4, such that the second flux barriers is asymmetric about the direct axis 138. Such is accomplished by tilting the first arm 144 in a first direction (e.g., a clockwise direction) and tilting the second arm 146 also in the first direction. Accordingly, a first angle A3 defined between the first arm 144 and the base 142 of the flux barrier 140 is, for the embodiment depicted, less than a second angle A4 defined between the second arm 146 and the base 142 of the flux barrier 140. In certain embodiments, the second angle A4 may be at least about 5° greater than the first angle A3, or at least about 10° greater than the first angle A3.

It should be appreciated, however, that for the embodiment depicted, the flux barrier 140 additionally defines a total angular difference between the first angular position P3 and the second angular position P4 (i.e., |P3|+|P4|). When the rotor section 120, 136 of FIGS. 6 and 7 are incorporated into the same rotor 14, the total angular difference between the first and second angular positions P3, P4 of the flux barrier 140 of the pole section 136 in FIG. 7 is equal to the total angular difference between the first and second angular positions P1, P2 of the pole section 120 in FIG. 6 (i.e., |P1|+|P2|=|P3|+|P4|).

Figure 8:
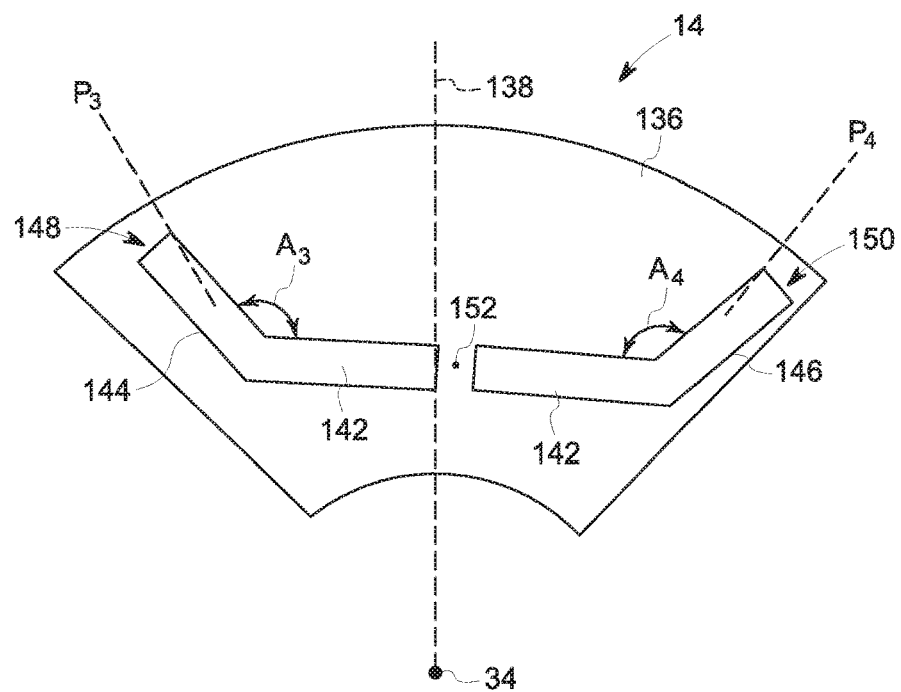
FIG. 8 is a close-up view of a modified pole section of a rotor in accordance with another exemplary embodiment of the present disclosure.
Figure 9:
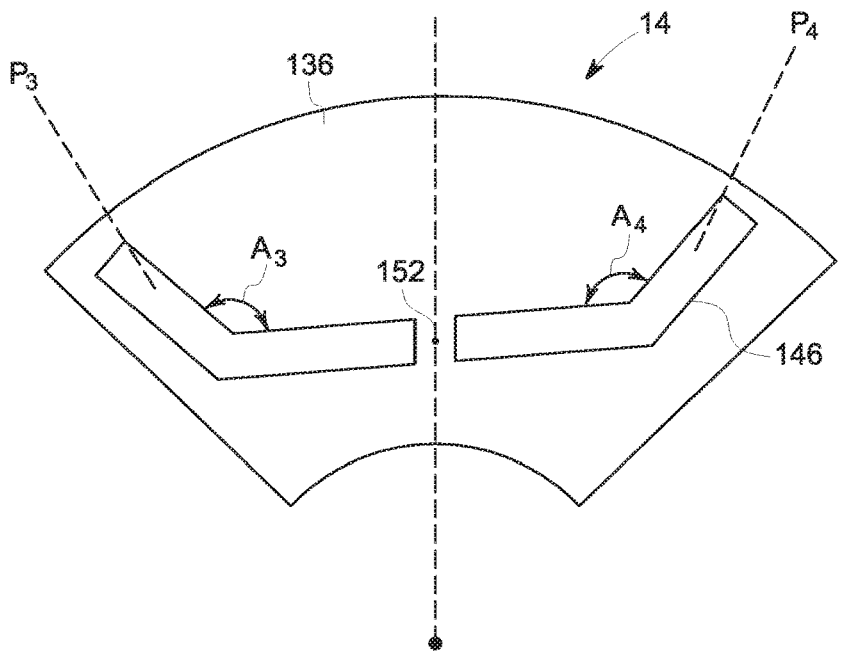
FIG. 9 is a close-up view of a modified pole section of a rotor in accordance with yet another exemplary embodiment of the present disclosure.

However, in other embodiments, the difference in magnitude between the first and second angular positions P3, P4 of a flux barrier 140 of the pole section 136 may be accomplished in any other suitable manner. For example, referring now to FIGS. 8 and 9, two additional embodiments of the pole section 136 of a rotor 14 of an electric machine are provided. The exemplary embodiments of FIGS. 8 and 9 are each configured in a substantially similar manner to the exemplary pole section 136 of FIG. 7. Accordingly, as is depicted, each pole section 136 defines a direct axis 138 and includes a flux barrier 140. Each flux barrier 140 includes a base 142, a first arm 144, and a second arm 146. Additionally, each first arm 144 includes a first end 148 at a first angular position P3 and each second arm 146 includes a second end 150 at a second angular position P4. For the embodiments of FIGS. 8 and 9, the first angular positions P3 are different in magnitude than the respective second angular positions P4.

More particularly, referring specifically to FIG. 8, the difference in magnitude between the first angular position P3 and the second angular position P4 of the flux barrier 140 relative to the direct axis 138 is accomplished by shifting the entire flux barrier 140 in the same direction circumferentially relative to the central axis 34. Specifically, for the embodiment depicted, the entirety of the flux barrier 140 has been shifted at least about 2°, such as at least about 4° in a clockwise direction, such that a magnitude of the first angular position P3 is less than a magnitude of the second angular position P4. With such an embodiment, a first angle A3 between the first arm 144 and the base 142 of the flux barrier 140 remains equal to a second angle A4 between the second arm 146 and the base 142 of the flux barrier 140. However, with such an embodiment, the base 142 of the flux barrier 140 no longer defines a 90° angle with the direct axis 138, and instead defines an oblique angle with the direct axis 138. Additionally, a centerpoint 152 of the base 142 of the flux barrier 140 no longer intersects with the direct axis 138.

Referring now specifically to FIG. 9, the difference in magnitude between the first angular position P3 and the second angular position P4 of the flux barrier 140 relative to the direct axis 138 is accomplished by rotating the flux barrier 140 about a centerpoint 152 of the base 142 of the flux barrier 140. Specifically, for the embodiment depicted, the centerpoint 152 is defined at a halfway point along a length of the base 142 of the flux barrier 140, and at a halfway point along a width of the base 142 of the flux barrier 140. For the embodiment depicted, the flux barrier 140 is rotated at least about 2°, such as at least about 4° in a counterclockwise direction about the centerpoint 152 of the flux barrier 140, such that the first angular position P3 of the first end 148 of the flux barrier 140 is different magnitude than the second angular position P4 of the second end 150 of the flux barrier 140, relative to the direct axis 138. Notably, with such an embodiment, a first angle A3 between the first arm 144 and the base 142 of the flux barrier 140 remains equal to a second angle A4 between the second arm 146 and the base 142 of the flux barrier 140. Again, however, with such an embodiment, the base 142 of the flux barrier 140 no longer defines a 90° angle with the direct axis 138, and instead defines an oblique angle with the direct axis 138.

Notably, however, with each of the embodiments of FIGS. 7 through 9, when the pole sections 120, 136 are incorporated into the same rotor 14, a total angular difference between the first angular position P3 and the second angular position P4 of each of the pole sections 136 are equal to the total angular difference between the first angular position P1 and the second angular position P2 of the pole section 120 in FIG. 6 (i.e., |P1|+|P2|=|P3|+|P4|). Accordingly, a total angular difference between the first and second angular positions P3, P4 remains unchanged despite a difference in magnitude between the first and second angular positions P3, P4 relative to a respective direct axis 138.

It should be appreciated, that although for each of the embodiments described above, the flux barriers 124, 140 are each configured as a "U-shaped" flux barrier, in other embodiments, the flux barrier may have any other suitable shape. For example, referring now to FIGS. 10 and 11, two rotor sections of a rotor 14 of an electric machine in accordance with an exemplary embodiment of the present disclosure are depicted including one or more pole sections having substantially "V-shape" flux barriers. Specifically, FIG. 10 depicts a reference pole section 154 of a rotor 14 of an electric machine in accordance with an exemplary embodiment of the present disclosure including a flux barrier 156, and FIG. 11 depicts a pole section 168 of the rotor 14 of the electric machine including a modified flux barrier 170.

Figure 10:
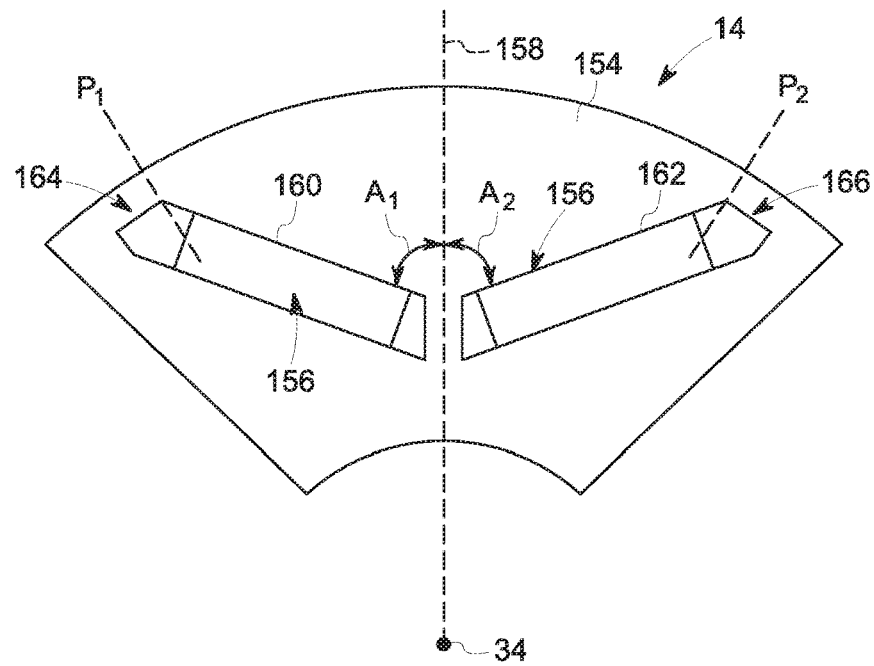
FIG. 10 is a close-up view of a reference pole section of a rotor in accordance with another exemplary embodiment of the present disclosure.

Referring first to FIG. 10, the exemplary reference pole section 154 defines a direct axis 158 and includes a flux barrier 156. The flux barrier 156 generally includes a first arm 160 and a second arm 162. The first arm 160 includes a first end 164 defining a first angular position P1 and the second arm 162 defines a second end 166 including a second angular position P2. Additionally, the first arm 160 defines a first angle A1 relative to the direct axis 158 and the second arm 162 defines a second angle A2 relative to the direct axis 158. For the embodiment depicted, the first angular position P1 is equal in magnitude to the second angular position P2 relative to the direct axis 158, and the first angle A1 is equal to the second angle A2. Accordingly, the flux barrier 156 of the exemplary pole section 154 of FIG. 10 is a "reference" flux barrier, or symmetric flux barrier.

Figure 11:
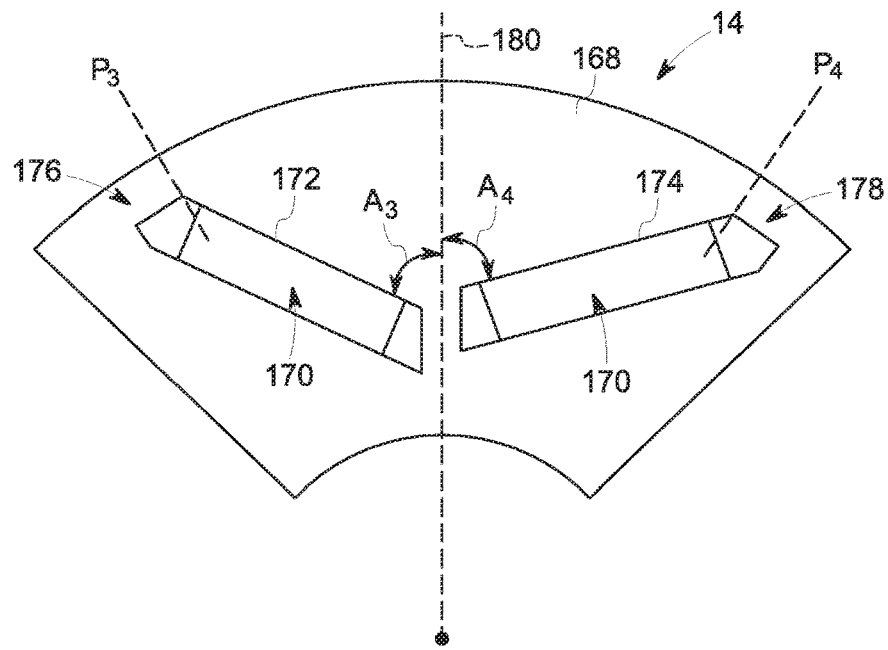
FIG. 11 is a close-up view of a modified pole section of a rotor in accordance with another exemplary embodiment of the present disclosure.

By contrast, referring now to FIG. 11, the exemplary pole section 168 depicted is configured as a modified pole section, including a modified flux barrier 170, or an asymmetric flux barrier 170. More specifically, the flux barrier 170 also includes a first arm 172 and a second arm 174, with the first arm 172 including a first end 176 defining a first angular position P3 and the second arm 174 including a second end 178 defining a second angular position P4. The first and second angular positions P3, P4 are defined relative to the direct axis 180. The first angular position P3 of the flux barrier 170 is different in magnitude than the second angular position P4 of the flux barrier 170. For the embodiment depicted, such is accomplished by tilting the first arm 172 of the flux barrier 170 in a first direction (e.g., a clockwise direction) and tilting the second arm of the flux barrier also in the first direction. Accordingly, for such an embodiment, a first angle A3 between the first arm 172 and the direct axis 180 is less than a second angle A4 of the second arm 174 in the direct axis 180. Notably, however, a total angular difference between the first and second angular positions P3, P4 of the exemplary flux barrier 170 of FIG. 11 is equal to a total angular difference between the first and second angular positions P1, P2 of the exemplary flux barrier 156 of FIG. 10 (i.e., |P1|+|P2|=|P3|+|P4|).

It should be appreciated, however, that in other embodiments, the "V-shaped" flux barrier 156 of FIG. 10 may, in other embodiments, be modified such that the first angular position P1 is different in magnitude than the second angular position P2 by rotating or otherwise moving the flux barrier 156 in any other suitable manner (see, e.g., FIGS. 8 through 9).

Figure 12:
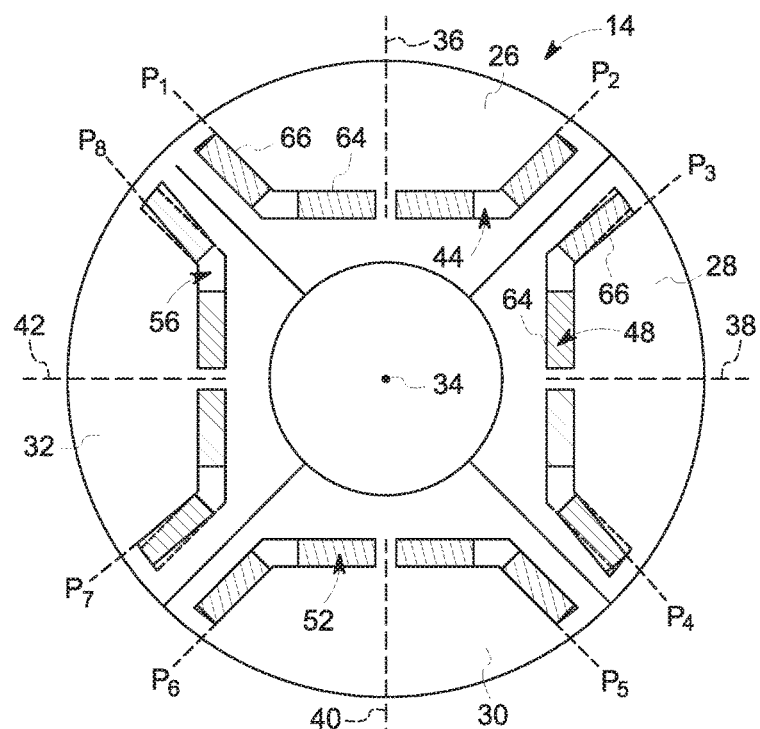
FIG. 12 is a cross-sectional view of a rotor of an electric machine in accordance with yet another exemplary embodiment of the present disclosure.

Moreover, referring now to FIG. 12, a rotor 14 of an electric machine in accordance with another exemplary embodiment of the present disclosure is depicted. As will be appreciated, the exemplary rotor 14 of FIG. 12 may be configured in a similar manner to the exemplary rotor 14 described above with reference to FIGS. 1 and 2. For example, the exemplary rotor 14 of FIG. 12 generally includes a first pole section 26, a second pole section 28, a third pole section 30, and a fourth pole section 32. The first pole section 26 defines a first direct axis 36, the second pole section 28 defines a second direct axis 38, the third pole section 30 defines a third direct axis 40, and the fourth pole section 32 defines a fourth direct axis 42. However, for the embodiment of FIG. 12, each pole section 26, 28, 30, 32 of the rotor 14 includes a single flux barrier. For example, the first pole section 26 includes a first flux barrier 44, the second pole section 28 includes a second flux barrier 48, the third pole section 30 includes a third flux barrier 52, and the fourth pole section 32 includes a fourth flux barrier 56. It should be appreciated, however, that in other embodiments, each of the pole sections 26, 28, 30, 32 may additionally include any other suitable number of flux barriers.

As is also depicted, the first flux barrier 44 includes a first end 60 defining a first angular position P1 and a second end 62 defining a second angular position P2; the second flux barrier 48 includes a first end 60 defining a third angular position P3 and a second end 62 defining a fourth angular position P4; the third flux barrier 52 includes a first end 60 defining a fifth angular position P5 and a second end 62 defining a sixth angular position P6; and the fourth flux barrier 56 includes a first end 60 defining a seventh angular position P7 and a second end 62 defining an eighth angular position P8. For the embodiment depicted, the first angular position P1 is equal in magnitude to the second angular position P2 relative to the first direct axis 36 of the first pole section 26, and the fifth angular position P5 is equal in magnitude to the sixth angular position P6 relative to the third direct axis 40 of the third pole section 30. Accordingly, the first pole section 26 and second pole section 30 are each symmetric pole sections. By contrast, the third angular position P3 is different in magnitude to the fourth angular position P4 relative to the second direct axis 38 of the second pole section 28, and the sixth angular position P6 is different in magnitude to the seventh angular position P7 relative to the fourth direct axis 42 of the fourth pole section 32. Accordingly, the second pole section 28 and fourth pole section 32 are each modified pole sections. More specifically, for the exemplary rotor 14 depicted in FIG. 12, every other pole section is a modified pole section, such that the pole sections alternate between symmetric pole sections (first and third pole sections 26, 30) and modified pole sections (second and fourth pole sections 28, 32). For the embodiment depicted, each modified pole section is modified an equivalent amount, however, in other embodiments, each sequential modified pole section may be modified a greater amount (see exemplary rotor 14 of FIG. 1), or a lesser amount than the previously modified pole section.

For the embodiment depicted, the second pole section 28 and the fourth pole section 32 are each modified by tilting arms of the respective flux barriers 48, 56 relative to the respective bases, similar to the exemplary embodiment of FIG. 7 (the "reference" positions are depicted in phantom). However, in other embodiments, it should be appreciated that one or both of the second pole section 28 and fourth pole section 32 may be modified in any other suitable manner (see, e.g., FIG. 8 and FIG. 9).

Figure 13:
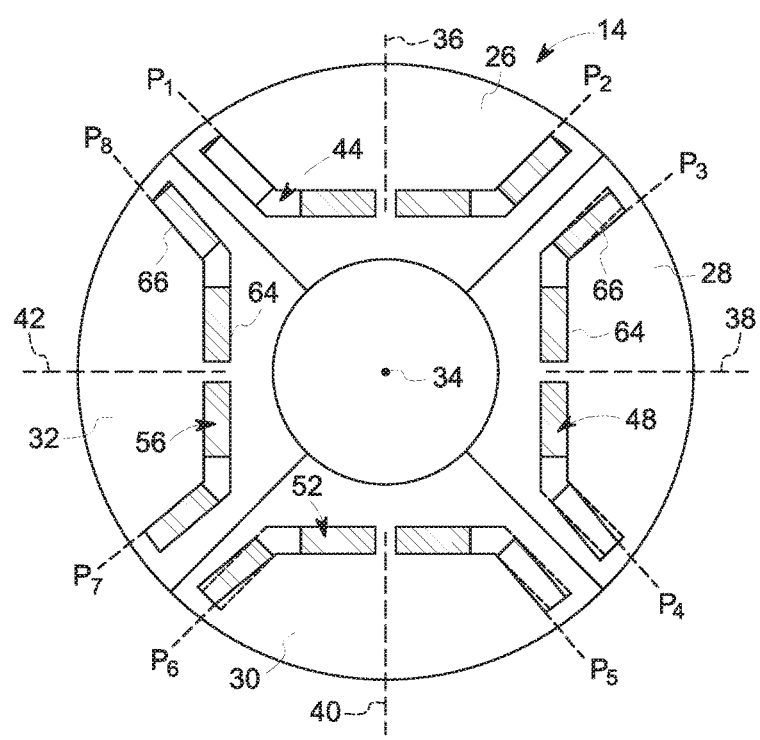
FIG. 13 is a cross-sectional view of a rotor of an electric machine in accordance with still another exemplary embodiment of the present disclosure.

Referring now to FIG. 13, a rotor 14 of an electric machine in accordance with another exemplary embodiment of the present disclosure is depicted. The exemplary rotor 14 of FIG. 13 may be configured in substantially the same manner as exemplary rotor 14 of FIG. 12. Accordingly, the same or similar numbers may refer to same or similar part. For example, as is depicted, the exemplary rotor 14 of FIG. 13 includes a first pole section 26 defining a first direct axis 36 and including a first flux barrier 44; a second pole section 28 defining a second direct axis 38 and including a second flux barrier 48; a third pole section 30 defining a third direct axis 40 and including a third flux barrier 52; and a fourth pole section 32 defining a fourth direct axis 42 and including a fourth flux barrier 56.

Additionally, the exemplary rotor 14 of FIG. 13 includes one or more modified pole sections and one or more symmetric, or reference, pole sections. But, for the embodiment depicted, the rotor 14 does not alternate between a single reference pole section and a single modified pole section, and instead includes a pair of reference pole sections adjacent to a pair of modified pole sections. More specifically, for the embodiment depicted, the rotor 14 is configured such that the fourth pole section 32 and first pole section 26 are each reference pole sections and the second pole section 28 and third pole section 30 are each modified pole sections. For the embodiment depicted, the second pole section 28 and third pole section 30 are modified by tilting arms of the respective flux barriers 48, 52 relative to the respective bases (the "reference" positions are depicted in phantom), similar to the exemplary embodiment of FIG. 7. However, in other embodiments, it should be appreciated that one or both of the second pole section 28 and third pole section 30 may additionally or alternatively be modified in any other suitable manner (see, e.g., FIG. 8 and FIG. 9).

Moreover, it should be appreciated, that although the exemplary rotor 14 of FIGS. 12 and 13 only include four pole sections, in other embodiments, the patterns depicted therein may be extrapolated out to any other suitable number of pole sections. For example, the exemplary rotor 14 of FIG. 12 may include any suitable even number of pole sections and the rotor 14 of FIG. 13 may include any suitable multiple of four pole sections. Additionally, as discussed above, the exemplary rotors of FIGS. 12 and 13 may, in other embodiments, include any suitable number of flux barriers, any suitable shape of flux barriers, may include permanent magnets at any suitable location, or may not include any permanent magnets, or may alternatively be configured as out-runner rotors, etc.

Figure 14:
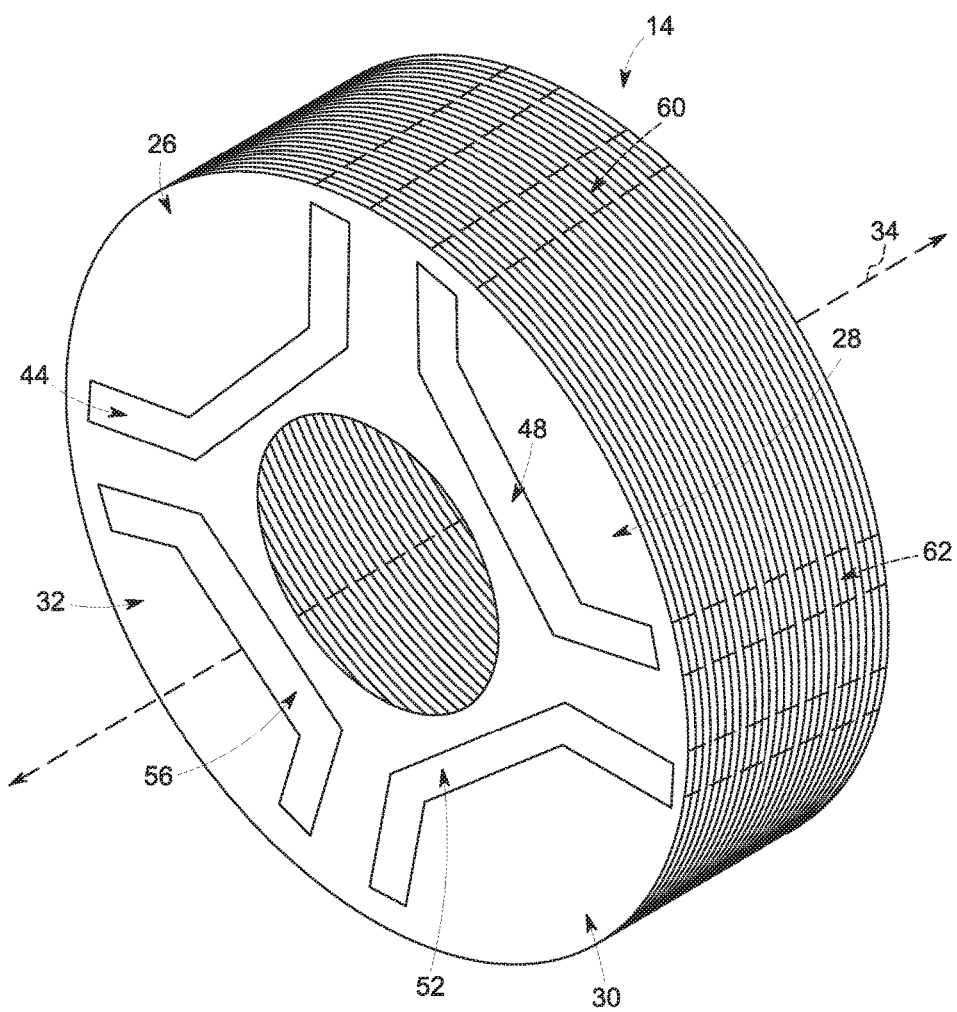
FIG. 14 is a perspective view of a rotor of an electric machine in accordance with an exemplary embodiment of the present disclosure.

Furthermore, referring now to FIG. 14, a perspective view is provided of a rotor 14 in accordance with an exemplary embodiment of the present disclosure. The rotor 14 of FIG. 14 may be configured in substantially the same manner as the exemplary rotor 14 described above with reference to FIG. 12 (or one or more of the other embodiments). As is depicted, the exemplary rotor 14 depicted is formed of a plurality of laminated ferromagnetic material slices or sections. However, in other embodiments, the rotor 14 may instead be fabricated from a single piece of ferromagnetic material produced for example (but not limited to) by forging, casting or additive manufacturing processes. Regardless of the formation process, the exemplary rotor 14 depicted is constant along an axial centerline 34 of the rotor 14, and consistently oriented along the axial centerline 34. Specifically, the angular positions of the first and second ends 60, 62 of the flux barriers 44, 48, 52, 56 of the respective pole sections 26, 28, 30, 32 of the rotor 14 does not change along the axial centerline 34 of the rotor 14.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electric machine comprising:
   a stator; and
   a rotor operable with the stator and including a pole section, the pole section defining a direct axis and a flux barrier including a first end and a second end, the first end of the flux barrier positioned proximate the stator and defining a first angular position relative to the direct axis, the second end positioned proximate the stator and defining a second angular position relative to the direct axis, the first angular position being different in magnitude than the second angular position;
   wherein the flux barrier defined by the pole section of the rotor is an outer flux barrier, and wherein the pole section of the rotor further defines an inner flux barrier with the outer flux barrier nested within the inner flux barrier, wherein the inner flux barrier is asymmetric about the direct axis.

2. The electric machine of claim 1, wherein the pole section is a second pole section, wherein the rotor further comprises a first pole section, wherein the first pole section also defines a direct axis, wherein the first pole section is symmetric about the direct axis.

3. The electric machine of claim 2, wherein the first pole section defines a total angular difference between the first angular position and the second angular position, wherein the second pole section also defines a total angular difference between the first angular position and the second angular position, and wherein the total angular difference of the first pole section is substantially equal to the total angular difference of the second pole section.

4. The electric machine of claim 1, wherein the electric machine is an interior permanent magnet synchronous electric machine, and wherein the rotor comprises a permanent magnet positioned within the flux barrier.

5. The electric machine of claim 1, wherein the electric machine is a synchronous reluctance electric machine.

6. The electric machine of claim 1, wherein the inner flux barrier includes a first end and a second end, wherein the first end of the inner flux barrier defines a first angular position relative to the direct axis, wherein the second end of the inner flux barrier defines a second angular position relative to the direct axis, wherein the first angular position of the first end of the outer flux barrier defines a difference with the second angular position of the second end of the outer flux barrier that is substantially equal to a difference defined between the first angular position of the first end of the inner flux barrier and the second angular position of the second end of the inner flux barrier.

7. The electric machine of claim 1, wherein the pole section is a second pole section, wherein the rotor further comprises:
a third pole section defining a flux barrier and a direct axis, wherein the third pole section is asymmetric about the direct axis.

8. The electric machine of claim 7, wherein the rotor further comprises:
a first pole section defining a flux barrier and a direct axis, wherein the flux barrier of the first pole section is symmetric about the direct axis.

9. The electric machine of claim 1, wherein the flux barrier comprises a first arm and a second arm, wherein the first arm defines a first angle with the direct axis and wherein the second arm defines a second angle with the direct axis, wherein the first angle is different than the second angle.

10. The electric machine of claim 1, wherein the flux barrier comprises a base portion, a first arm, and a second arm, wherein the first arm defines a first angle with the base portion and wherein the second arm defines a second angle with the base portion, wherein the first angle is different than the second angle.

11. The electric machine of claim 1, wherein the flux barrier comprises a base portion, and wherein the base portion defines an oblique angle with the direct axis.

12. The electric machine of claim 1, wherein the rotor further comprises a plurality of pole sections, wherein each pole section defines a direct axis, and wherein the direct axes are evenly spaced along a circumferential direction of the electric machine.

13. The electric machine of claim 1, wherein the pole section is a second pole section, wherein the rotor further comprises a first pole section, a third pole section, and a fourth pole section, wherein each of the pole sections define a flux barrier and a direct axis, wherein the flux barriers of the first and third pole sections are symmetric about the respective direct axes, and wherein the flux barriers of the second and fourth pole sections are asymmetric about the respective direct axes.

14. The electric machine of claim 1, wherein the pole section is a second pole section, wherein the rotor further comprises a first pole section, a third pole section, and a fourth pole section, wherein each of the pole sections define a flux barrier and a direct axis, wherein the flux barriers of the first and second pole sections are asymmetric about the respective direct axes, and wherein the flux barriers of the third and fourth pole sections are symmetric about the respective direct axes.

15. The electric machine of claim 1, wherein the pole section is a second pole section, wherein the rotor further comprises a first pole section, a third pole section, and a fourth pole section, wherein each of the pole sections define a flux barrier and a direct axis, wherein the flux barriers of the first, second, third, and fourth pole sections are asymmetric about the respective direct axes.

16. The electric machine of claim 1, wherein the rotor is formed of a plurality of laminated ferromagnetic material.

17. The electric machine of claim 1, wherein the rotor is positioned within the stator.

18. The electric machine of claim 1, wherein the stator is positioned within the rotor.

19. A synchronous electric machine comprising:
a stator; and
a rotor operable with the stator and comprising
a first pole section defining a first direct axis and a first flux barrier, the first flux barrier including a first end defining a first angular position and a second end defining a second angular position, the first angular position of the first end of the first flux barrier being equal in magnitude to the second angular position of the second end of the first flux barrier; and
a second pole section defining a second direct axis and a second flux barrier, the second flux barrier including a first end defining a first angular position and a second end defining a second angular position, the first angular position of the first end of the second flux barrier being different in magnitude than the second angular position of the second end of the second flux barrier;
wherein the first flux barrier defined by the first pole section is an outer flux barrier, and wherein the first pole section further defines an inner flux barrier with the outer flux barrier nested within the inner flux barrier, wherein the inner flux barrier is asymmetric about the direct axis.

* * * * *